Feb. 25, 1958 J. R. HOLLINS 2,824,917
TURN SIGNALLING ARRANGEMENT
Filed March 11, 1955 2 Sheets-Sheet 1

INVENTOR
Jesse R Hollins
BY
ATTORNEY

Feb. 25, 1958 J. R. HOLLINS 2,824,917
TURN SIGNALLING ARRANGEMENT
Filed March 11, 1955 2 Sheets-Sheet 2
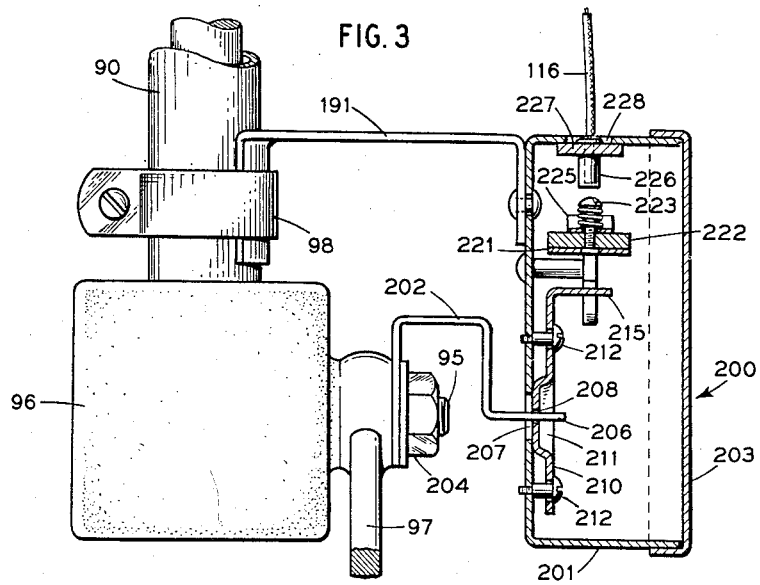
INVENTOR.
Jesse R. Hollins
BY
his attorney

United States Patent Office

2,824,917
Patented Feb. 25, 1958

2,824,917

TURN SIGNALLING ARRANGEMENT

Jesse R. Hollins, Brooklyn, N. Y.

Application March 11, 1955, Serial No. 493,617

8 Claims. (Cl. 200—61.54)

This invention relates to turn signalling circuits and, more particularly, to a turn signal switch which is cancelled after a predetermined time or movement of the vehicle responsive to completion of substantially a 90° turn, whichever occurs first.

The conventional factory installed selector switch for vehicle turn signalling systems is mounted on the steering column and includes cams of friction rollers cooperable with means on the steering shaft to "cancel" the signal and restore the selector switch to neutral. As the vehicle completes the turn corresponding to the signal effected by operation of the selector switch lever, the movement of the steering shaft back toward the straight line driving position effects operation of the switch cams or friction rollers to restore the selector switch to the neutral or off position. As usually installed, such switches require a predetermined angular oscillatory movement of the steering wheel before self-cancelling is effectuated, the amount of requisite steering motion being almost the equivalent of that required for a full 90° turn.

When driving on high speed multi-lane roads, it is customary for the driver to signal a proposed change of lanes by using his direction signal selector switch before "cutting out" or "cutting in" relative to a line of vehicles. The amount of steering wheel movement required for such lane changes is relatively small and not sufficient to effect self-cancellation of the signal as the movement is completed. Hence, unless the driver happens to notice the continued operation of the usual signal pilot lamp, or the position of the selector switch, or hears the ticking of the flasher, the vehicle signal lamps continue to indicate a proposed turn even after the turn has been completed. This is not only an unnecessary load on the signal system and vehicle electrical system, but also, and more importantly, is a definite safety hazard due to the resultant false signalling information given to approaching or following vehicles. Such conditions also occur when, in negotiating a turn, the vehicle and consequently the steering wheel traverses less than the minimum angle for effectuating signal cancellation.

It has also been proposed to provide a selector switch in which cancellation is effected by automatic timer controlled means. While such a switch will be automatically restored to neutral a predetermined time interval after initial operation, there are attendant disadvantages in that the signal may be cancelled before the vehicle has made its intended turning movement; for example, in heavy traffic, or at intersections, the start of the turning movement of the vehicle may be delayed for a period longer than that for which the cancellation timer is set, in which case unless the operator manually resets the timer, he will not properly and adequately warn approaching or following vehicles of an intended turning movement.

However, it frequently happens in a time or time delay controlled signalling system, that a turn is fully completed quite some time before the preset signal indication is cancelled. This creates a condition involving the possibility of some hazard in that the vehicle continues to display a turn signal until the time cycle has been completed even though the turn has been negotiated by the vehicle and the same is moving unidirectionally.

In accordance with the present invention such possibility of a hazardous situation is avoided by providing, in association with the time delay system aforesaid, a steering gear operated energizing switch for the magnetically operated latch releasing means. This switch is designed to be electrically and mechanically interassociated with the latch release means of the system aforesaid so that when the vehicle has negotiated a turn of substantially 90° and commences to move unidirectionally, the steering gear operated switch becomes effective to energize the latch release means irrespective of the fact that the time cycle has not been completed. Since this associated switch operates only in relation to an angular oscillation of the steering column which approximates 90°, it will have no effect when the turn signal selector is preset and operated to indicate a lane changing movement.

For an understanding of the invention principles, reference is made to the following description of typical embodiments thereof as illustrated in the accompanying drawing, in which:

Fig. 3 is a view similar to Fig. 2 showing a modified form of switch in section; and Fig. 4 is an elevation view, with cover removed, of the switch shown in Fig. 3.

Figure 1:
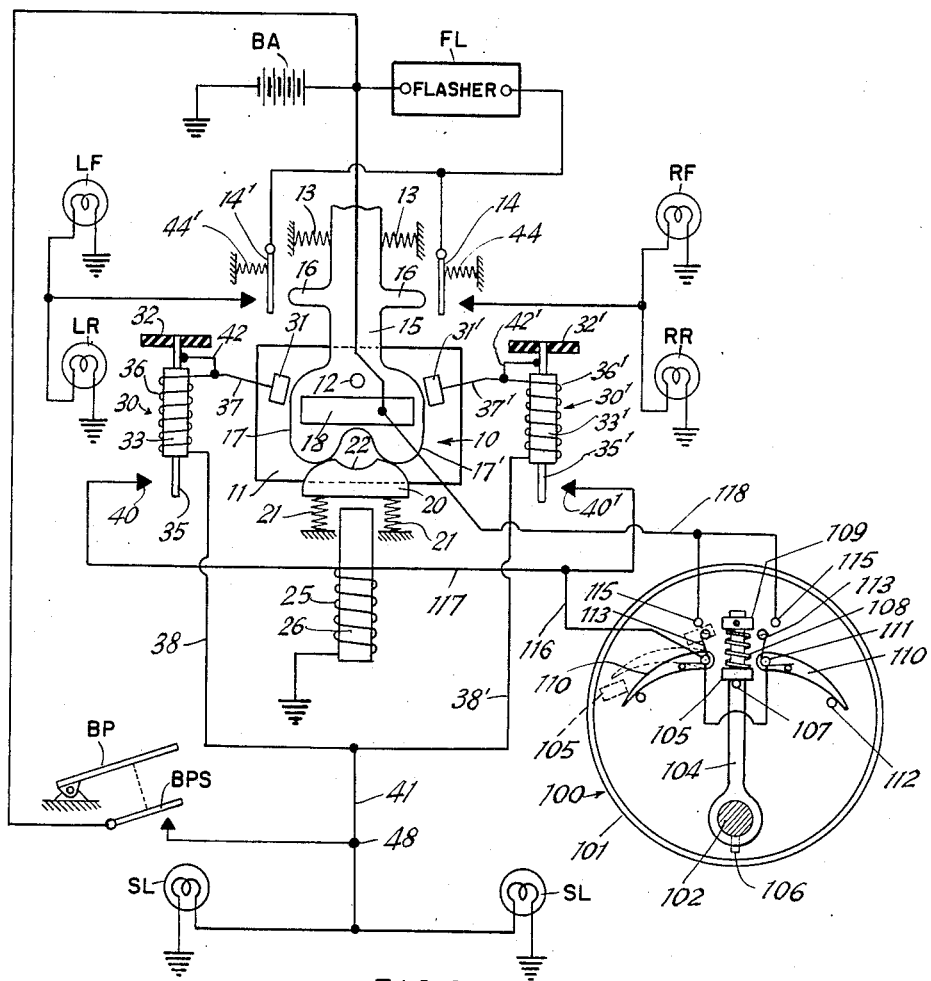
Fig. 1 is a partially schematic plan view and wiring diagram of one form of vehicle turn signalling arrangement embodying the invention.

Referring to Fig. 1, the invention is illustrated as incorporated in the turn signaling arrangement of my said copending application, and which includes a turn signal selector switch 10 for selectively connecting grounded turn signal lamps LF, LR or RF, RR to the grounded vehicle battery BA through a flasher FL, to intermittently flash the left or right signal lamps to indicate a proposed turn. The turn signal lamps may be separate units, may be extra filaments in the usual parking and tail lamps, or may be the parking and tail lamps, and are shown as separate units merely for clarity of illustration. The vehicle is also provided with the usual grounded stop lamps SL controlled by a switch BPS closed when brake pedal BP is operated.

Switch 10 includes a dielectric base 11 on which is oscillatably mounted a dielectric selector lever 15, lever 15 being pivoted to base 11 by screw or rivet 12. Springs 13 bias operator or lever 15 to the neutral position. In either selected operative position, abutments 16 on lever 15 close a selected one of a pair of switches 14, 14' each operative to connect the signal lamps on one side of the vehicle to battery BA through flasher FL, said switches being normally biased to non-connected position by springs 44, 44'. For a purpose to be described, the inner end of lever 15 is formed with a pair of spaced cam fingers or abutments 17.

Adjacent the inner end of lever 15 is a latch means 20 of magnetizable material forming the armature of a relay having an operating coil 25 and a core 26 in operative relation to latch 20. Latch 20 is biased toward lever 15 by springs 21. As lever 15 is moved to an operative position, an abutment 17 or 17' will move latch 20 toward armature 26 and will then slip into a conforming recess 22 in latch 20.

Lever 15 carries a conductive plate 18, connected to battery BA, and arranged to engage either of a pair of contact members 31, 31' in an operated position of lever 15. Contact members 31, 31' are connected in the energizing circuits of thermostatic devices 30, 30'. Each device 30, 30' includes a bimetallic strip 35, 35' fixed at one end in a dielectric mounting 32, 32'. A sleeve 33, 33', which may be of dielectric material, is placed on each strip 35, 35' and carries a high resistance heating winding 36, 36' for the bimetallic strip.

A conductor 37, 37' connects one end of each winding 36 or 36' to a contact member 31 or 31'. The opposite ends of the windings are commonly connected by conductors 38, 38', and a conductor 41, to the ungrounded sides of stop lamps SL. Branch conductors 42, 42' each connect one of the bimetallic strips 35, 35' to a contact member 31, 31'. The free end of each strip is arranged, when deflected due to heating, to engage a contact 40 or 40', these contacts being commonly connected to one end of winding 25. The opposite end of winding 25 is grounded.

The arrangement of Fig. 1 operates in the following manner. Assuming a right turn is to be signalled, lever 15 is swung clockwise until cam abutment 17 is engaged in recess 22 of latch 20. Abutment 16 closes switch 14 against the bias of its spring 44 connecting signal lamps RF and RR to battery BA through flasher FL.

At the same time, contact plate 18 engages contact member 31 completing an energizing circuit for device 30 as follows: battery BA, plate 18, member 31, conductor 37, winding 36, conductors 38 and 41, stop lamps SL, and ground. The relatively high resistance of winding 36 restricts the current flow through lamps SL to a value insufficient to illuminate the latter. Under the heating effect of winding 36, bimetallic strip 35 deflects and eventually engages contact 40. This completes a circuit as follows: battery BA, contact plate 18, contact member 31, conductors 37 and 42, strip 35, contact 40, winding 25, and ground. Winding 25, being fully energized over a low resistance circuit, magnetizes core 26 to pull latch 20 away from lever 15, whereupon springs 13 restore lever 15 to the neutral position, disengaging plate 18 from member 31 and spring 44 biases switch 14 to open position. Lamps RF and RR are extinguished and winding 36 is deenergized and cools so that strip 35 disengages contact 40.

Should the vehicle be stationary before making the indicated turn, the heating of coil 36 is effectively delayed until the vehicle is in motion. With the vehicle stationary, brake pedal BP will be operated, closing switch BPS and energizing lamps SL. This effective shunt around coil 36 places point 48 in conductor 41 at substantially battery potential, so that both ends of coil 36 are at substantially the same potential and no curent will flow through the coil. When the brakes are released, this shunt is removed, and coil 36 heats strip 35 as described.

The operation of switch 10 in signaling a left turn is similar to that just described, and it is not believed necessary to describe the same in detail.

As stated previously, it frequently happens that a pre-signalled 90° turn is completed in a shorter time interval than the predetermined time of action of the thermostatic release means, so that the turn signal continues to flash even though the vehicle is following a straight path and no further turn is contemplated. To avoid this contingency, a steering gear operated switch 100 is arranged to energize the latch release means when a turn of a predetermined degree, such as substantially 90°, has been completed.

Figure 2:
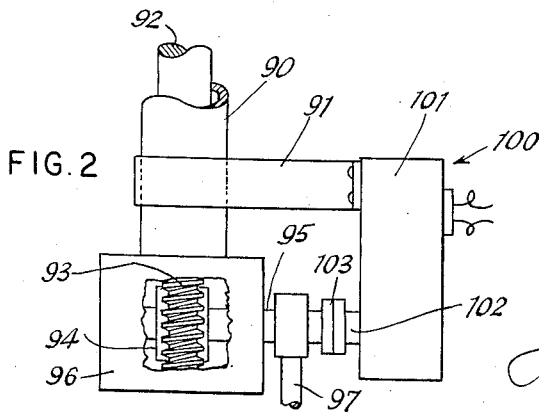
Fig. 2 is a partial plan view of the lower end of a steering column with the invention switch mounted thereon.

Referring to Figs. 1 and 2, switch 100 includes a casing 101 mounted on the lower end of the steering column 90 by means of a bracket 91. Column 90 encloses the steering shaft 92 having a worm 93 on its lower end meshing with a worm gear 94. The shaft 95 of gear 94 projects outside the steering column cap or housing 96 and has the drag link 97 secured thereto. Drag link 97 is connected to the steering linkage to turn the front wheels when shaft 92 is rotated by the steering wheel.

A rock shaft 102 is mounted in casing 101 and projects therefrom for connection to wormgear axle or shaft 95 by means of a coupling 103 which may be a reduction gearing. A radial arm 104 is mounted on shaft 103 within casing 101, being secured to rotate therewith by suitable means such as a set screw 106.

A conductive switch closure collar 105 is slidably mounted, in electrically insulated relation on arm 104, and is biased to engage a pin 107 by a coil spring 108 embracing arm 104 and having its outer end engaged with a fixed stop 109 on the outer end of arm 104. When arm 104 swings in either direction, collar 105 is adapted to ride under either of a pair of conductive latch dogs 110, 110 pivoted on pins 111 and having their free ends biased toward stops 112 by springs 113. Contacts 115 are mounted above pivot pins 111 by a distance such that, when collar 105 rides along the upper edge of a latch dog 110 it will electrically connect the latch dog to contact 115.

Latch dogs 110 are jointly connected to one end of coil 25 by a conductor 116 connected to conductor 117 connecting contacts 40, 40' to winding 25. Contacts 115 are jointly connected to plate 18 by a conductor 118. Thus, when collar 105 connects a dog 110 to a contact 115, battery BA is connected to coil 25 as follows: battery BA, plate 18, conductor 118, contact 115, collar 105, dog 110, conductors 116, 117, winding 25, and then to ground.

The arrangement operates in the following manner. During a turn of less than a predetermined degree, such as a lane change, arm 104 will swing so as to carry collar 105 outwardly along the underside of a dog 110, raising this dog against its spring tension. When the wheels are restraightened, collar 105 is moved back to its central position along the underside of the dog. As collar 105 does not engage a contact 115, coil 25 is not energized by switch 100.

However, should a full 90° turn be made, for example, collar 105 will be carried beyond the outer end of a dog 110 and the dog, lifted by collar 105, will snap down. When the wheels are re-straightened, collar 105 will ride inwardly along the upper side of dog 110, compressing spring 108. When collar 105 bridges dog 110 and contact 115, coil 25 will be energized to retract latch 20 from lever 15 so that the selector lever 15 returns to the neutral position, cancelling the signal indication.

Referring to Figs. 3 and 4, the modified steering gear operated switch 200 includes a casing 201 mounted on the lower end of the steering column 90 by means of a strap bracket 191 secured to the column by a clamp 98. A cover 203 is provided for housing 201, this cover being removed in Fig. 4. A key 202, in the form of a flat bar bent generally to a U-shape, is secured to the end of shaft 95 by a securing nut 204, so that key 202 is rotated with shaft 95.

The bent outer end 206 of key 202 projects through a circular opening 207 in housing 201 and through a rectangular slot 208 in a circular plate 210 having a dished central or hub portion 211. Studs 212 extend through concentric arcuate slots 213 in plate 210 and are threaded into housing 201. These studs oscillatably mount plate 210 on the base of housing 201. At a point on its periphery, plate 210 is formed with a radial arm 214 having an outwardly bent end 215.

As plate 210 is rocked by key 202 during movement of shaft 95, arm end 215 is arranged to engage the downwardly projecting arms 216 of either of a pair of pivotal latch dogs 220 having arms 217 projecting toward each other and connected by a tension spring 218. Arms 217 act as stops for a spring arm 221 mounted on a wall of casing 201 and carrying a mounting block 222 of dielectric material.

A headed stud 223 secured to extend from the upper surface of block 222 extends through a hole in a bridging circuit closure 225 biased against block 222 by a coil spring 224 embracing stud 223. Closure 225 can thus rock on block 222 and is arranged to engage and interconnect contacts 226 on a dielectric block 227 extending across an opening 228 in the upper wall of housing 201. Conductors 116 and 118 connect contacts 226 in an energizing circuit for the latch release magnetizing coil in the manner shown in Fig. 1.

Switch 200 operated as follows. When the vehicle is steered to turn, plate 210 is rocked right or left. By virtue of such rocking, arm end 215 may strike the lower arm 216 of one dog 220, rocking this dog against the tension of spring 218. Should the degree of turn by at or above a set value, such as 90°, dog 220 will be rocked sufficiently so that arm end 215 passes beneath arm 216 and dog 220 snaps back against spring arm 221.

Now, when the wheels are straightened following the turning movement, plate 210 will rock back to the illustrated position. During such return movement, arm end 215 will engage the outer edge of a dog arm 216 and rock the dog in a direction to move spring arm 221 upwardly to engage closure 225 with contacts 226 and energize the latch release magnet. Arm end 215 then snaps beneath dog arm 216 and the parts resume the illustrated position.

While specific embodiments of the invention have been shown and described in detail to illustrate the application of the invention principles, it will be understood that the invention may be embodied otherwise without departing from such principles.

What is claimed is:

1. A motor vehicle steering mechanism actuated switch comprising, in combination, switch means mounted for movement toward a closed position responsive to turning movements of the steering mechanism; an oscillatably mounted operator engaged with said switch means and selectively effective to move the latter to its closed position; means, including an element operable by the vehicle steering mechanism, effective to oscillate said operator; said operator being oscillated by said element to move said switch means to its closed position only upon return of the steering mechanism to a substantially straight course position after completion of a predetermined degree of turning movement of the steering mechanism; and a pair of contacts interconnected by said switch means only in the closed position of the latter.

2. A motor vehicle steering mechanism actuated switch comprising, in combination, switch means including a switch closure connected to the vehicle steering mechanism for movement away from and return to a neutral position responsive to steering movements of said mechanism; said closure following substantially coincident advance and return paths when the vehicle is making a turn of less than a predetermined degree, and following a different return path when the vehicle is completing a turn of greater than such predetermined degree; an oscillatably mounted operator engaged with said closure to guide the latter along said advance and return paths; means, including said closure and an element operable by the vehicle steering mechanism, for oscillating said operator; said operator being oscillated sufficiently to guide said closure along said different return path only responsive to completion of a predetermined degree of movement of the steering mechanism and a pair of contacts disposed along such different return path for bridging by said closure in its return movement.

3. The improvement claimed in claim 2 in which said switch means includes a shaft oscillatable with a drag link operated by said steering mechanism and an arm extending radially from said shaft; said closure being slidable on said shaft and normally biased away from the outer end thereof; and means comprising said operator engaged by said closure upon rocking of said shaft, and effective, upon a predetermined substantial movement of said arm in either direction from a neutral position, to force said closure toward the outer end of said arm as the latter is returned to the neutral position; said closure bridging said contacts only when it is adjacent the outer end of said arm.

4. The improvement claimed in claim 3 in which said operator engaged by said closure comprises a pair of latch dogs pivotally mounted on either side of the neutral position of said arm and extending outwardly from such neutral position; and means biasing said latch dogs inwardly toward said shaft; said closure normally engaging the inner surface of a latch dog and riding along the outer surface thereof only when said arm is rocked sufficiently to carry said closure beyond the free end of a latch dog.

5. The improvement claimed in claim 4 in which said latch dogs constitute one of the contacts bridgeable by said closure, the other contacts being spaced outwardly from the latch dog pivots.

6. The improvement claimed in claim 1 in which said element comprises a member oscillatable substantially coaxially with a drag link operated by said steering mechanism, said member having a radial extension; a switch closure means arranged to bridge a pair of contacts; means normally biasing said closure means away from said contacts; said operator comprises a pair of pivotally mounted latch dogs in the path of movement of said radial extension and engageable with said closure means to engage the same with said contacts; said radial extension swinging a latch dog away from said closure means during turning of the steering mechanism and, upon turning movement of a predetermined degree, moving past the latch dog and biasing the latter to engage the closure means with said contacts as the dirigible wheels of the vehicle are straightened following such turn.

7. The improvement claimed in claim 6 in which said latch dogs are V-shape and pivoted at their apices, one arm of each dog extending toward the corresponding arm of the other dog and being connected thereto by a spring; said one arms engaging said closure means; the other arms of the latch dogs being engageable by said radial extension.

8. The improvement claimed in claim 6 in which said extension comprises a projection on a circular plate oscillatable about the drag link axis and connected to the drag link by a key.

References Cited in the file of this patent

UNITED STATES PATENTS

| | | |
|---|---|---|
| 1,437,086 | Bater | Nov. 28, 1922 |
| 1,502,639 | May | July 22, 1924 |
| 1,647,663 | Pollock | Nov. 1, 1927 |
| 1,983,973 | Fingler | Dec. 11, 1934 |
| 2,040,923 | Doane | May 19, 1936 |
| 2,129,558 | Beaverstock | Sept. 6, 1938 |
| 2,137,319 | Trautner | Nov. 22, 1938 |
| 2,186,766 | Metcalf | Jan. 9, 1940 |
| 2,194,210 | Nesson | Mar. 19, 1940 |
| 2,266,918 | Benson | Dec. 31, 1940 |
| 2,656,426 | Dibelka | Oct. 20, 1950 |
| 2,704,360 | Werstein | Mar. 15, 1955 |
| 2,710,317 | Pearl | June 7, 1955 |